United States Patent
Fukui et al.

(10) Patent No.: US 6,930,711 B2
(45) Date of Patent: Aug. 16, 2005

(54) SIGNAL PROCESSING APPARATUS AND METHOD

(75) Inventors: Takaaki Fukui, Kanagawa (JP); Eiichiro Ikeda, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 695 days.

(21) Appl. No.: 10/107,029

(22) Filed: Mar. 26, 2002

(65) Prior Publication Data

US 2002/0140828 A1 Oct. 3, 2002

(30) Foreign Application Priority Data

Mar. 29, 2001 (JP) ..................................... 2001-097031

(51) Int. Cl.[7] .............................................. H04N 9/73
(52) U.S. Cl. .................. 348/225.1; 348/234; 348/256; 348/280; 382/167; 358/520
(58) Field of Search .......................... 348/222.1, 223.1, 348/225.1, 256, 273, 280, 241, 234–238; 382/162, 167; 358/518, 520

(56) References Cited

U.S. PATENT DOCUMENTS

| | | | | |
|---|---|---|---|---|
| 5,737,017 A | * | 4/1998 | Udagawa et al. | 348/280 |
| 5,966,222 A | * | 10/1999 | Hirata et al. | 358/520 |
| 6,449,060 B1 | * | 9/2002 | Kawai et al. | 358/1.9 |
| 6,611,287 B1 | * | 8/2003 | Yamamoto et al. | 348/222.1 |
| 6,721,003 B1 | * | 4/2004 | Tsuruoka et al. | 348/240.2 |
| 6,853,748 B2 | * | 2/2005 | Endo et al. | 382/167 |
| 2002/0025069 A1 | | 2/2002 | Endo et al. | 382/167 |
| 2002/0051088 A1 | * | 5/2002 | Ikeda et al. | 348/630 |

FOREIGN PATENT DOCUMENTS

| | | | | |
|---|---|---|---|---|
| EP | 1246745 | * 10/2002 | ............ | H04N/9/64 |
| JP | 08 023541 A | 1/1996 | | |
| JP | A 2002-016930 | 1/2002 | | |
| JP | 2002-300590 | * 10/2002 | ............ | H04N/9/07 |

OTHER PUBLICATIONS

Specification and eight (8) sheets of drawings from U.S. Appl. No. 09/853,536, filed May 11, 2001 entitled *"Signal Processing Apparatus and Method for Reducing Generation of False Color by Adaptive Luminance Interpolation."*.
Patent Abstracts of Japan, JP 11220749, Aug. 10, 1999.
Patent Abstracts of Japan, JP 11220742, Aug. 10, 1999.

* cited by examiner

*Primary Examiner*—Ngoc-Yen Vu
*Assistant Examiner*—Hung H. Lam
(74) *Attorney, Agent, or Firm*—Morgan & Finnegan, LLP

(57) ABSTRACT

A signal process for interpolating color signals is executed. In this process, color image data output from image sensor covered by a plurality of color filters that form a predetermined matrix is interpolated, horizontal and vertical correlation levels are discriminated on the basis of the color image data, first color difference signals are calculated by color-separating interpolated image data of respective colors in a direction with the higher correlation level on the basis of the discrimination result, and second color difference signals are calculated by a predetermined arithmetic operation different from first color difference signal calculation unit on the basis of the interpolated image data of respective colors. The calculated first or second color difference signals are selected and output based on the first and second color difference signals.

19 Claims, 9 Drawing Sheets

FIG. 4

| P1(R) | P2(G1) | P3(R) |
| --- | --- | --- |
| P4(G2) | P5(B) | P6(G2) |
| P7(R) | P8(G1) | P9(R) |

FIG. 6

| 1/4 | 1/2 | 1/4 |
|-----|-----|-----|
| 1/2 | 1   | 1/2 |
| 1/4 | 1/2 | 1/4 |

FIG. 8

| 1/8 | 1/4 | 1/8 |
|---|---|---|
| 1/4 | 1/4 | 1/4 |
| 1/8 | 1/4 | 1/8 |

FIG. 9

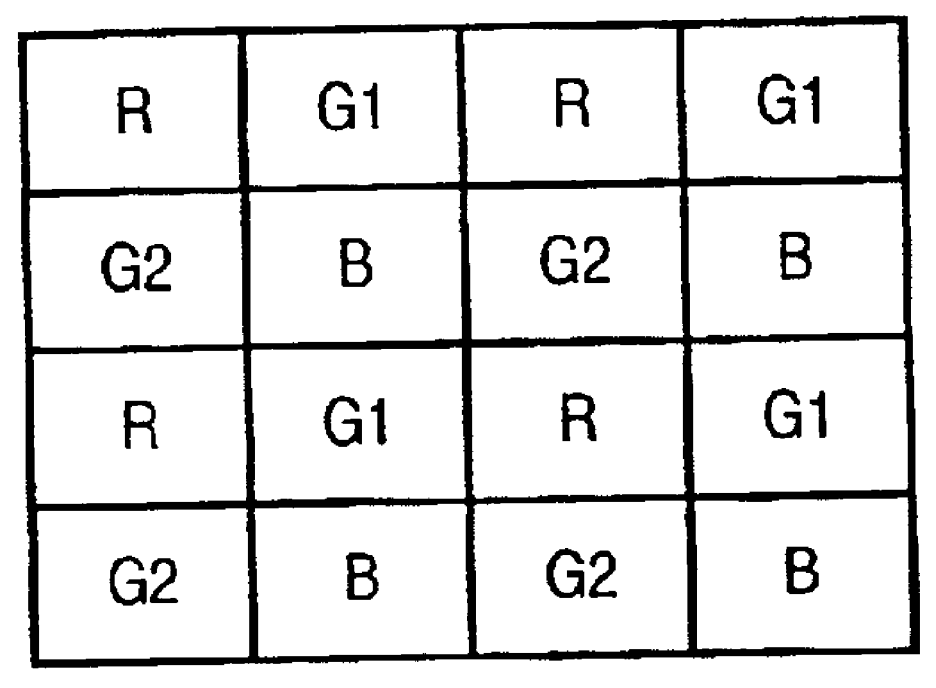

| R | G1 | R | G1 |
|---|----|---|----|
| G2 | B | G2 | B |
| R | G1 | R | G1 |
| G2 | B | G2 | B |

SIGNAL PROCESSING APPARATUS AND METHOD

FIELD OF THE INVENTION

The present invention relates to an image sensing apparatus and method, and a signal processing apparatus and method and, more particularly, to an image sensing apparatus and method, and a signal processing apparatus and method, which can execute a signal process for reducing color moiré for color image data.

BACKGROUND OF THE INVENTION

According to a conventional false color suppression method, when a color filter has a matrix of red (R), green (G), and blue (B) filters shown in FIG. 9 (note that G1 and G2 shown in FIG. 9 are both G filters, but are distinguished for the purpose of easy understanding), a color difference generation circuit makes color interpolation so that the individual pixels respectively have signals corresponding to R, G1, B, and G2 filters (these signals are also indicated by R, G1, B, and G2), (1) the circuit then compares (R−G1) and (R−G2), mixes (R−G1) and (R−G2) or selects one of them in accordance with the difference between (R−G1) and (R−G2), and outputs the obtained signal as an (R−G) signal, and (2) the circuit compares (B−G1) and (B−G2), mixes (B−G1) and (B−G2) or selects one of them in accordance with the difference between (B−G1) and (B−G2), and outputs the obtained signal as a (B−G) signal.

In this manner, a process for reducing false colors while maintaining tone expressions is performed by selectively generating the color difference signals.

However, in the conventional method, since color separation directions are independently selected to mix colors upon generating the (R−G) and (B−G) signals, different directions and different ratios may be used to generate the color difference signals, (R−G) and (B−G) signals, which may result in generating another false color.

SUMMARY OF THE INVENTION

The present invention has been made in consideration of the above situation, and has as its object to obtain a false color suppression effect around the Nyquist frequency without generating another false color.

It is another object of the present invention to prevent color loss even when an object includes many high-frequency components.

It is still another object of the present invention to prevent another false color from being generated even when an object image has a high saturation and contains many high-frequency components.

According to the present invention, the foregoing object is attained by providing a signal processing apparatus comprising: an image sensor covered by a plurality of color filters which form a predetermined matrix; an interpolation unit adapted to execute an interpolation process of color image data output from the image sensor; a discrimination unit adapted to discriminate horizontal and vertical correlation levels on the basis of the color image data; a first color difference signal calculation unit adapted to calculate first color difference signals by color-separating image data of respective colors interpolated by the interpolation unit in a direction with a higher correlation level on the basis of the discrimination result of the discrimination unit; a second color difference signal calculation unit adapted to calculate second color difference signals by a predetermined arithmetic operation different from the first color difference signal calculation unit on the basis of image data of respective colors interpolated by the interpolation unit; and a selector adapted to select and output either of the first and second color difference signals on the basis of the first and second color difference signals.

According to the present invention, the foregoing object is also attained by providing a signal processing method comprising: converting an optical image into an electrical signal using image sensor covered by filters of a plurality of colors, which form a predetermined matrix, and outputting color image data; executing an interpolation process on the basis of the color image data, so that pixels respectively have image data of the plurality of different colors; discriminating horizontal and vertical correlation levels on the basis of the color image data; calculating first color difference signals by color-separating interpolated image data of respective colors in a direction with a higher correlation level on the basis of the discrimination result; calculating second color difference signals by a predetermined arithmetic operation different from an operation for obtaining the first color difference signal on the basis of interpolated image data of respective colors; and selecting and outputting either of the first and second color difference signals on the basis of the first and second color difference signals.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view for explaining an interpolation method according to the embodiment of the present invention;

FIG. 6 shows an example of an interpolation filter according to the first embodiment of the present invention;

FIG. 8 shows an interpolation filter for a G signal according to the second embodiment of the present invention; and FIG. 9 shows an example of a color filter matrix.

DETAILED DESCRIPTION OF THE PREFERRED EMBODIMENTS

Preferred embodiments of the present invention will be described in detail in accordance with the accompanying drawings.

<First Embodiment>

Figure 1:
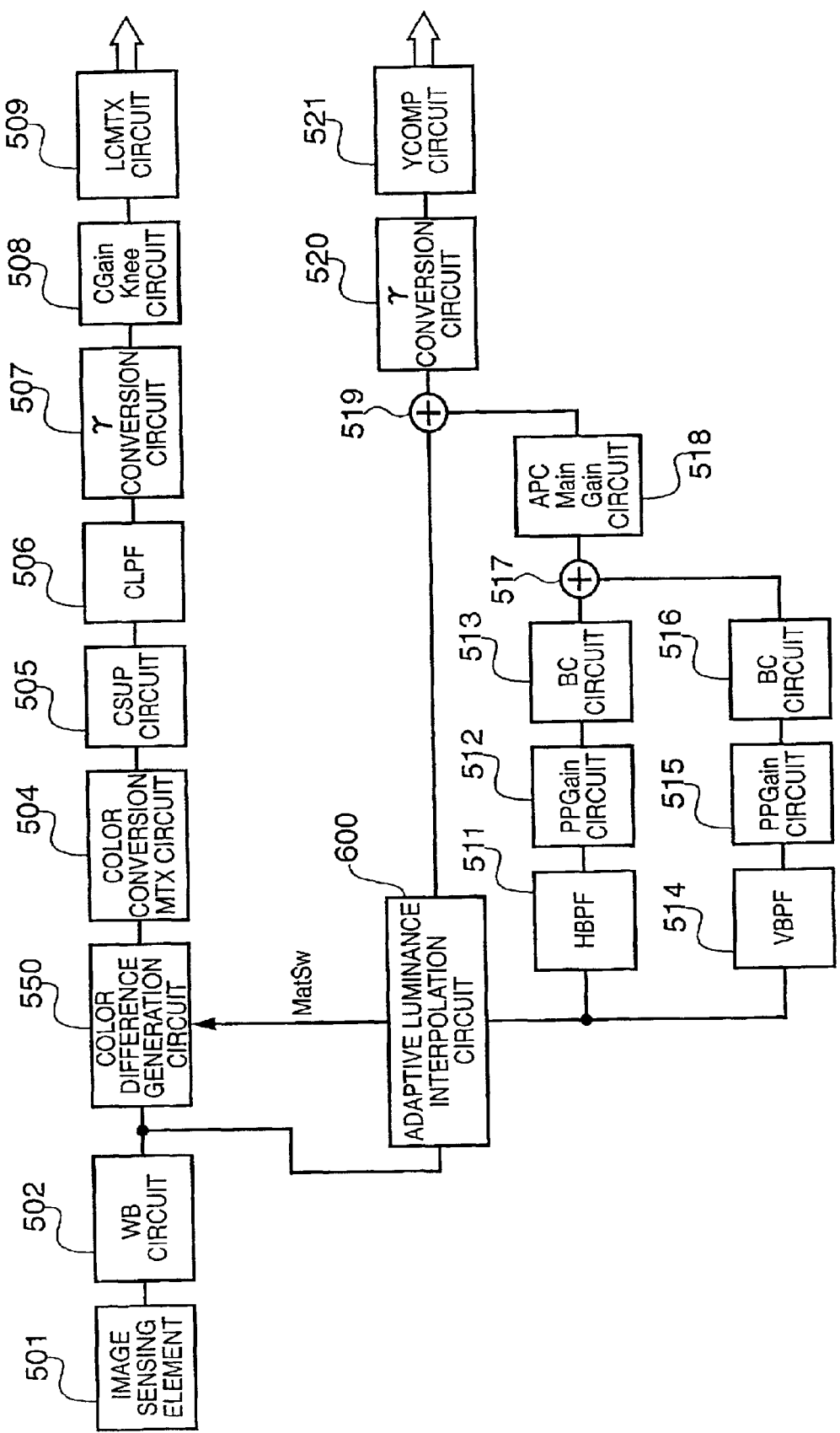
FIG. 1 is a block diagram showing the arrangement of a signal processing unit according to an embodiment of the present invention.

FIG. 1 is a block diagram showing the arrangement of an image sensing apparatus according to the first embodiment, and especially shows the arrangement of an image signal unit.

A signal output from a CCD image sensing element 501 undergoes white gain adjustment in a white balance (WB) circuit 502, and is then sent to an adaptive interpolation circuit 600. The adaptive luminance interpolation circuit 600 adaptively generates a luminance signal by calculating vertical/horizontal correlation levels upon generating the luminance signal, and outputs a vertical/horizontal stripe discrimination signal to a color difference generation circuit 550. After that, a horizontal band-pass filter (HBPF) 511 and vertical band-pass filter (VBPF) 514 lift the frequency components slightly lower than the Nyquist frequency weakened by a notch filter.

PP (Aperture Peak) Gain circuits 512 and 515 then adjust both the horizontal and vertical amplitudes, and base clip (BC) circuits 513 and 516 cut small amplitudes to remove noise. An adder 517 adds horizontal and vertical components, an APC (Aperture Control) Main Gain circuit 518 multiplies the sum signal by a main gain, and an adder 519 adds the output from the circuit 518 to a baseband signal. The output from the adder 519 undergoes gamma conversion by a gamma conversion circuit 520, and then undergoes luminance signal level compensation by a luminance compensation (YCOMP) circuit 521.

As color signal processes, the signal from the white balance circuit 502 is also sent to the color difference generation circuit 550, and undergoes color interpolation, thus generating vertical/horizontal stripe discrimination signals R−G and B−G on the basis of a color signal output from the adaptive luminance interpolation circuit 600. A color conversion matrix (MTX) 504 converts R−G and B−G signals into R−Y and B−Y signals. A chroma suppress (CSUP) circuit 505 suppresses color difference gains of low- and high-luminance regions, and a chroma low-pass filter (CLPF) 506 drops the high-frequency range of colors. The band-limited chroma signal is converted into R, G, and B signals and simultaneously undergoes gamma conversion by a gamma conversion circuit 507. The gamma-converted R, G, and B signals are converted into color difference signals R−Y and B−Y again, which signals undergo saturation gain adjustment by a Chroma Gain (CGain) Knee circuit 508. Furthermore, a Linear Clip Matrix (LCMTX) circuit 509 makes fine correction of hue components and corrects hue misregistration due to individual variations of image sensing elements, thus outputting color difference signals U and V.

Note that the adaptive luminance interpolation circuit 600 adaptively generates a luminance signal by calculating vertical/horizontal correlation levels upon generating the luminance signal, and outputs a vertical/horizontal stripe discrimination signal to the color difference generation circuit 550. The color difference generation circuit 550 executes a process using the vertical/horizontal stripe discrimination signal upon generating color difference signals. The color difference signal generation process in the image signal unit of the present invention will be described below with reference to the flow chart of FIG. 2.

Figure 3:
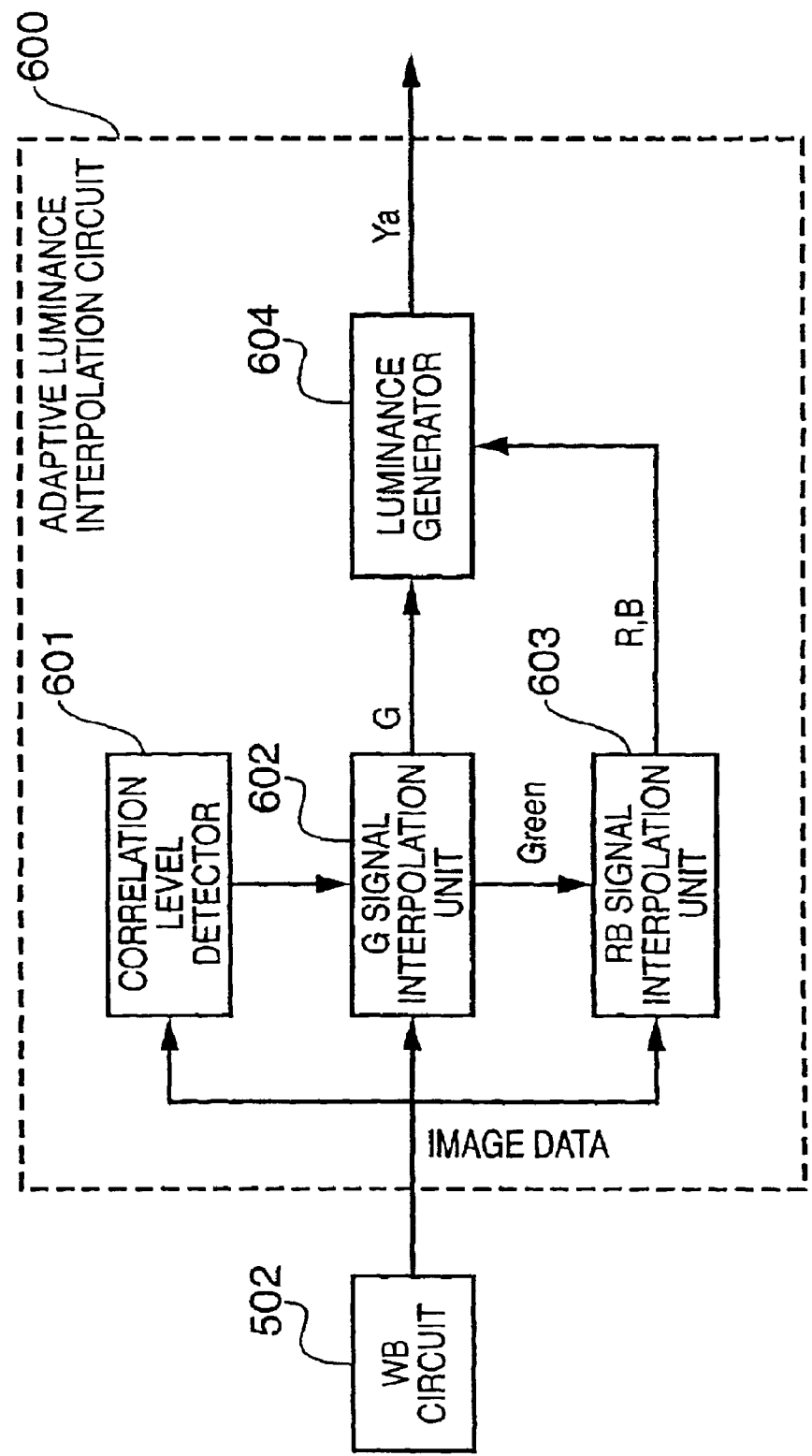
FIG. 3 is a block diagram showing an adaptive luminance interpolation circuit according to the embodiment of the present invention.

FIG. 3 shows the arrangement of the adaptive luminance interpolation circuit 600. Based on image data input from the WB circuit 502 (step S11), a correlation level detector 601 detects vertical and horizontal correlation levels (step S12). The correlation level detection method will be briefly explained below.

Figure 4:
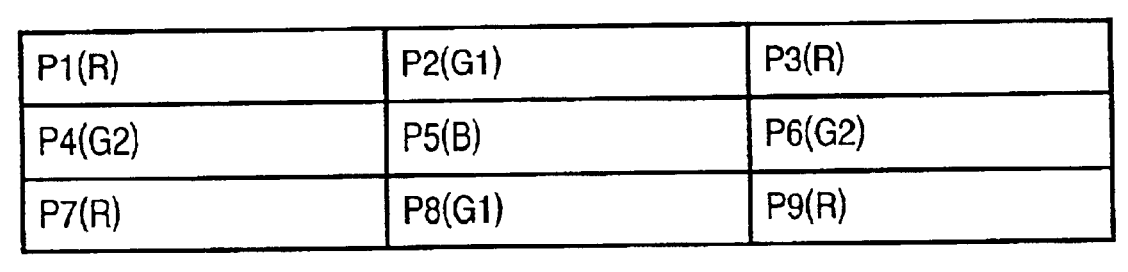

For all pixels other than green, i.e., red and blue pixels, a green signal is interpolated. When the image sensing element 501 has a filter matrix shown in, e.g., FIG. 4, and a green signal (P5(G)) is interpolated at pixel P5 in FIG. 4 (P1 to P9 indicate pixel positions, and symbols in parentheses indicate color signals obtained from these pixels and correspond to filter colors), signal correlation of upper, lower, right, and left neighboring pixels of the pixel to be interpolated is detected, thereby discriminating vertical and horizontal stripes. That is, the absolute values of the differences between the upper and lower neighboring pixels, and right and left neighboring pixels of the pixel to be interpolated are calculated.

$HDiff=|P4(G2)-P6(G2)|$, $VDiff=|P2(G1)-P8(G1)|$

The difference between the HDiff and VDiff is used as an interpolation direction discrimination signal MatSw. That is, $MatSw=HDiff-VDiff$ A G signal interpolation unit 602 adaptively interpolates so that all pixels have a green signal, by selecting horizontal or vertical interpolation in accordance with the correlation level detected by the above method. More specifically, if the interpolation direction discrimination signal MatSw output from the correlation level detector 601 is negative, it means that horizontal correlation is strong, and the unit 602 performs interpolation using pixel signals in the horizontal direction. On the other hand, if the difference is positive, the unit 602 performs interpolation using pixel signals in the vertical direction. Note that MatSw may be output as a binary signal indicating positive or negative (e.g., MatSw=0 for positive and MatSw=1 for negative, or vice versa).

An RB signal interpolation unit 603 interpolates based on the green signal so that all pixels have R and B signals. Using R, G, and B signals obtained for respective pixels, a luminance generator 604 generates and outputs a luminance signal by calculating, for instance:

$0.33R+0.59G+0.11B$

Figure 5:
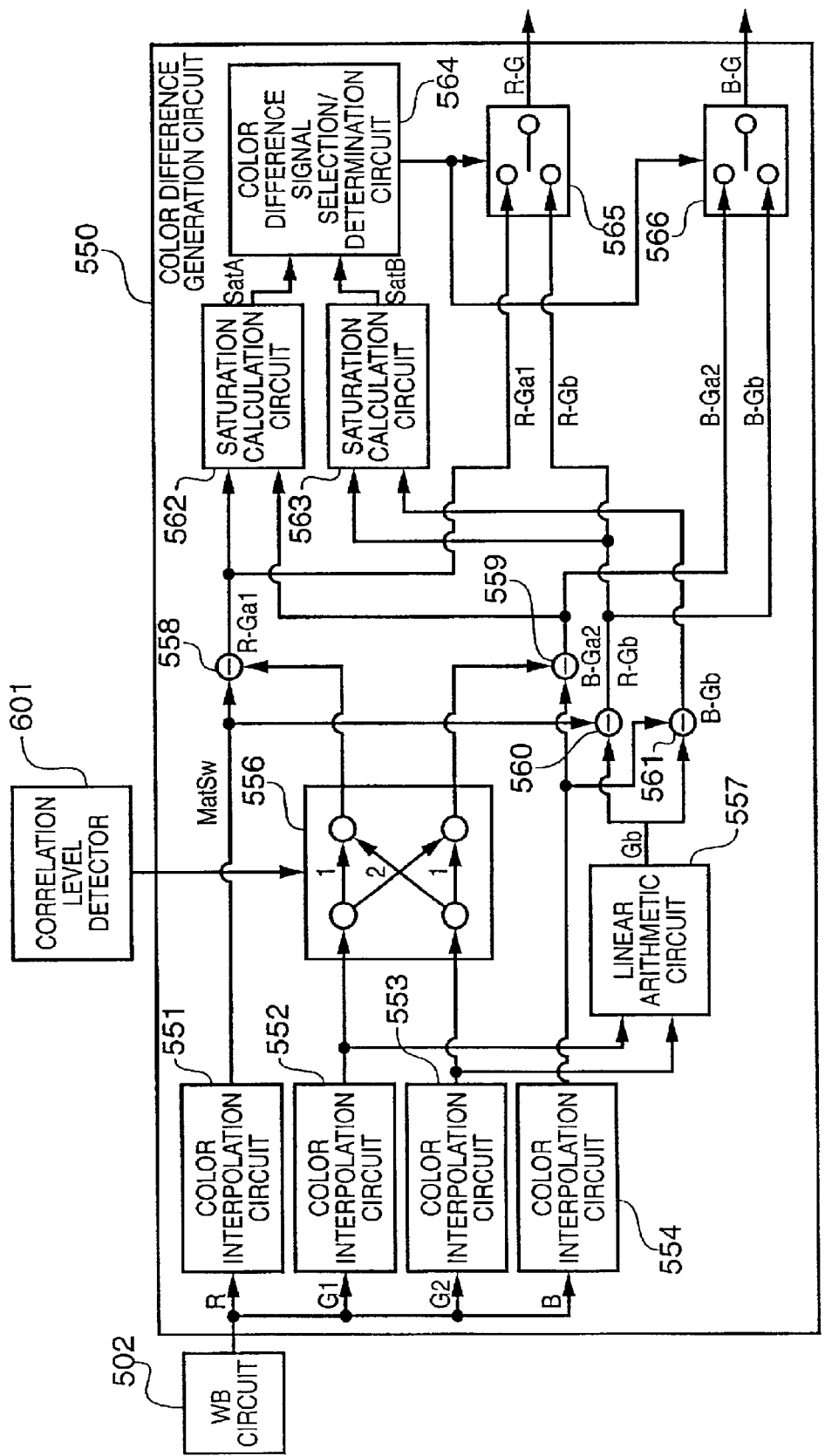
FIG. 5 is a block diagram showing the arrangement of a color difference generation circuit according to a first embodiment of the present invention.

The detailed arrangement of the color difference generation circuit 550 in the first embodiment of the present invention will be described below with reference to FIG. 5.

Figure 6:
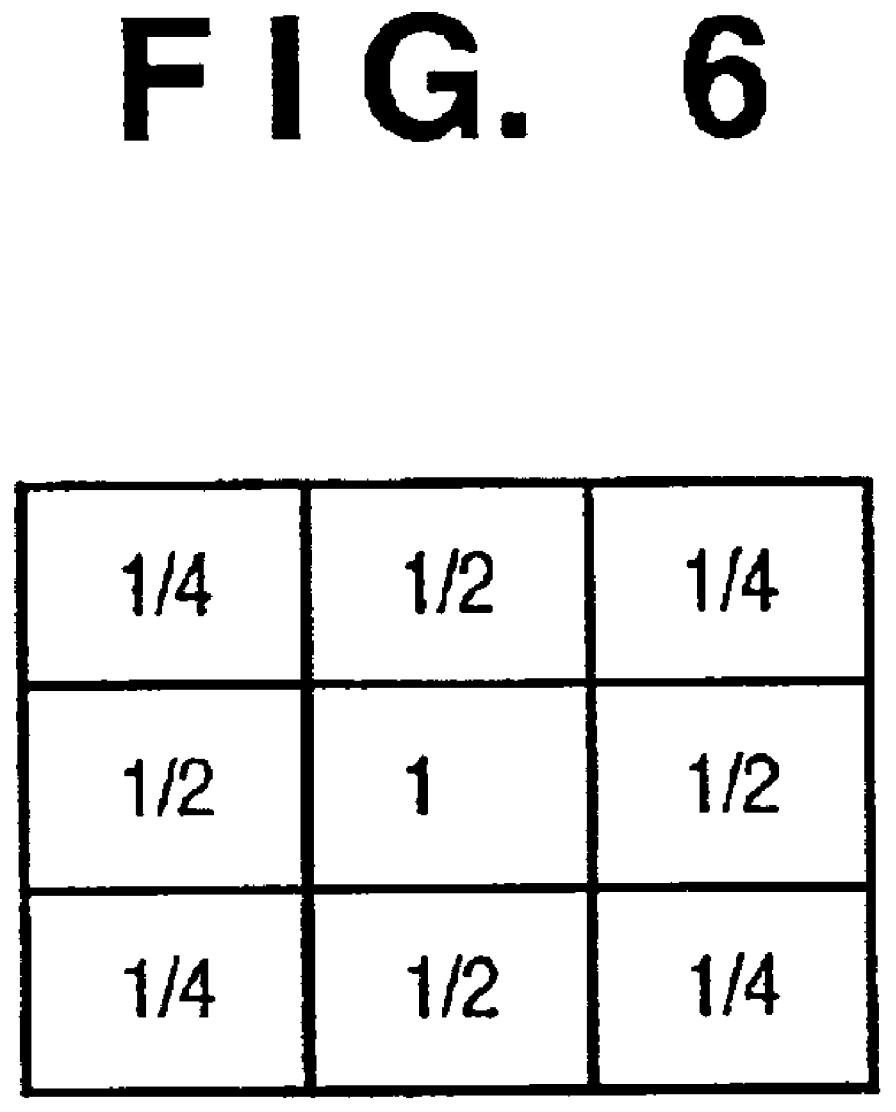

Reference numerals 551 to 554 denote color interpolation circuits which correspond to color filters R, G1, G2, and B, and are provided as circuits for synchronizing color signals. Interpolation is made using an interpolation filter shown in FIG. 6 to calculate and interpolate R, G1, G2, and B signals for each pixel (step S13).

Reference numeral 556 denotes a switch, which selects, based on the interpolation direction discrimination signal MatSw obtained by the correlation level detector 601, route 1 if horizontal correlation is strong (YES in step S14), i.e., if MatSw is negative, or route 2 if vertical correlation is strong (NO in step S14), i.e., if MatSw is positive. Reference numerals 558 and 559 denote subtractors for subtracting color signals of respective pixels. Upon switching by the switch 556, the subtractors 558 and 559 output (R−G1) and (B−G2) when horizontal correlation is strong (step S15), or output (R−G2) and (B−G1) when vertical correlation is strong (step S16). With this arrangement, color separation is made in one of the horizontal and vertical directions, in which correlation is strong. For the sake of simplicity, the signal (R−G1) or (R−G2) output from the subtractor 558 will be referred to as (R−Ga1) hereinafter, and the signal (B−G2) or (B−G1) output from the subtractor 559 will be referred to as (B−Ga2) hereinafter.

Reference numeral 557 denotes a linear arithmetic circuit, which generates a Gb signal by (G1+G2)/2 using the G1 and G2 signals interpolated by the color interpolation circuits 552 and 553. This Gb signal may be calculated by another arithmetic formula. Reference numerals 560 and 561 denote subtractors. The subtractors 560 and 561 respectively calculate (R−Gb) and (B−Gb) (step S17).

Reference numerals 562 and 563 denote saturation calculation circuits which respectively output saturation values SatA and SatB (step S18). The saturation values SatA and SatB are respectively given by:

$$SatA=|R-Ga1|+|B-Ga2|$$

$$SatB=|R-Gb|+|B-Gb|$$

or $$SatA=\sqrt{(R-Ga1)^2+(B-Ga2)^2}$$

$$SatB=\sqrt{(R-Gb)^2+(B-Gb)^2}$$

Note that calculation formulas used to calculate saturation values are not limited to these ones. For example, a square sum may be calculated instead.

Reference numeral 564 denotes a color difference signal selection/determination circuit; and 565 and 566, selectors for selecting signals in accordance with a selection signal output from the color difference signal selection/determination circuit 564. The color difference signal selection/determination circuit 564 generates a selection signal used to select (R−Ga1) and (B−Ga2) or (R−Gb) and (B−Gb) on the basis of the saturation values SatA and SatB, and supplies the selection signal to the selectors 565 and 566. If SatA−SatB<0 (YES in step S19), the color difference signal selection/determination circuit 564 generates a signal for selecting (R−Ga1) and (B−Ga2) (step S20); if SatA−SatB≧0 (NO in step S19), it generates a signal for selecting (R−Gb) and (B−Gb) (step S21).

Note that calculation formulas used to obtain the selection signal are not limited to these specific ones.

The signals selected by the selectors 565 and 566 are output as (R−G) and (B−G) signals to the subsequent color conversion MTX circuit 504 (step S22).

As described above, according to the first embodiment, a saturation value obtained from the color difference signals, which are obtained by color separation in the horizontal or vertical direction indicated by the correlation level discrimination signal, is compared with a saturation value obtained from color difference signals, which are obtained by color separation in both vertical and horizontal directions, and the color difference signals corresponding to the smaller saturation value are selected. In this manner, in a frequency region lower than the Nyquist frequency, color difference signals obtained by color separation in the direction indicated by the correlation level discrimination signal are output; in a region having a frequency exceeding the Nyquist frequency and in which a wrong vertical/horizontal discrimination result may be obtained, color signals obtained by color separation in both the vertical and horizontal direction are output. As a result, color interpolation can be made without losing DC component colors, and without generating another false color in a high-frequency, high-saturation object image.

Figure 2:
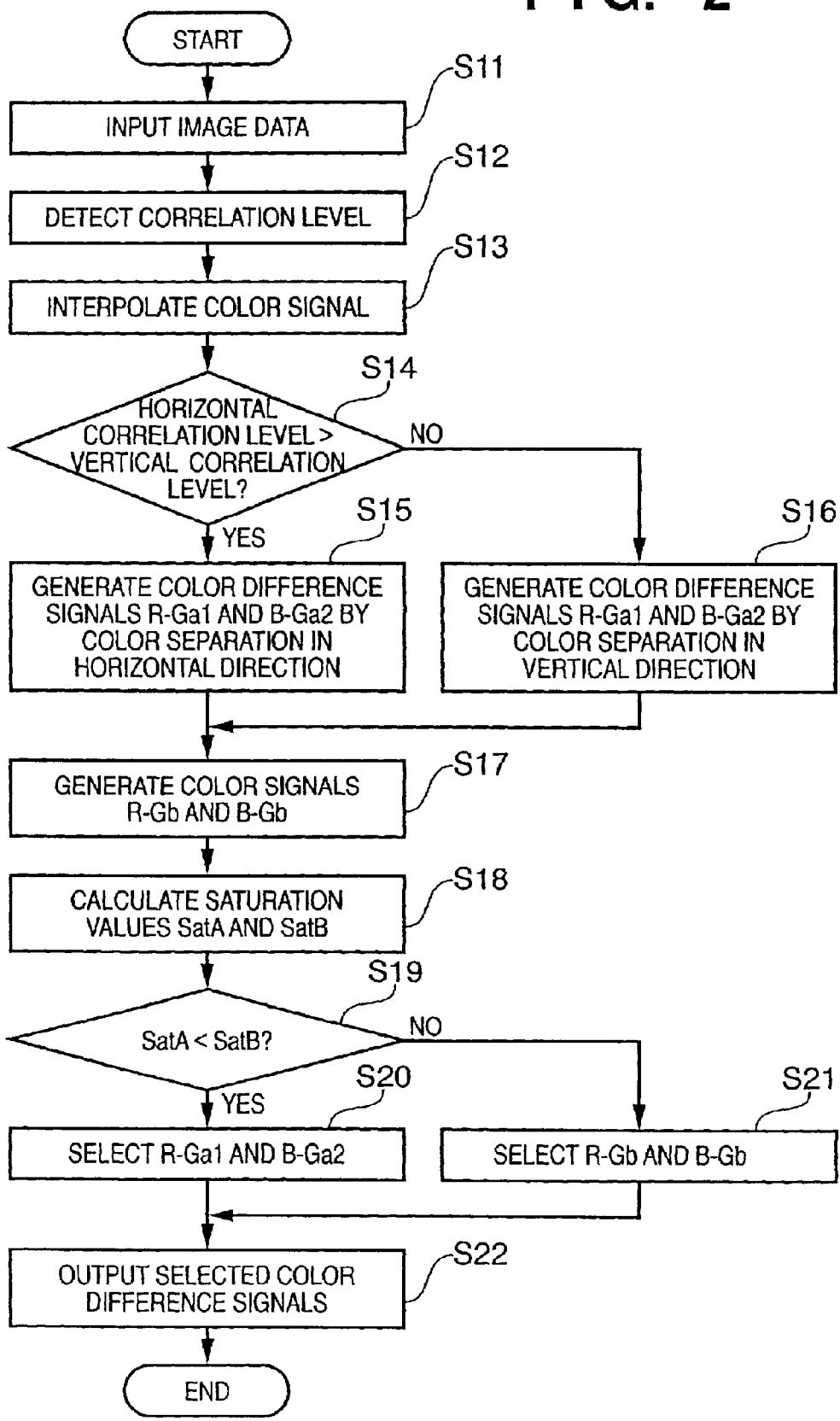
FIG. 2 is a flow chart showing a color difference signal generation process according to the embodiment of the present invention.

In the flow chart shown in FIG. 2, color signals are interpolated after the correlation level is detected, and color difference signals R−Gb and B−Gb are generated after color difference signals R−Ga1 and B−Ga2 are generated. However, the order of these processes is not limited to this, and the order of these processes may be reversed or these processes may be executed at the same time.

<Second Embodiment>

The second embodiment of the present invention will be described below. Since the arrangement of a signal processing unit of an image sensing apparatus according to the second embodiment is the same as that described in the first embodiment with reference to FIG. 1, a description thereof will be omitted. In the second embodiment, the arrangement of the color difference generation circuit 550 is different from that in the first embodiment. The color difference generation circuit 550 of the second embodiment will be described below.

Figure 7:
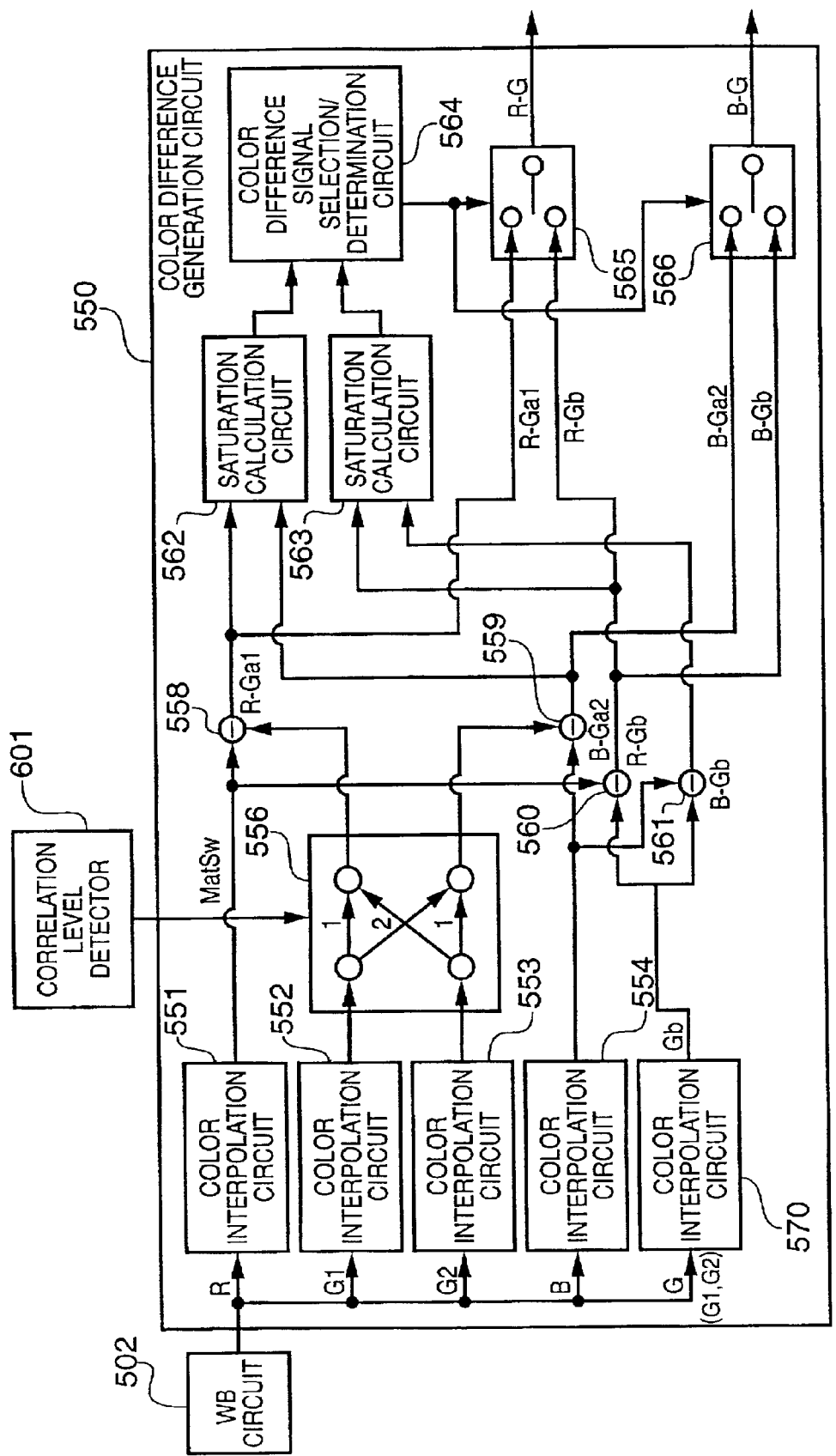
FIG. 7 is a block diagram showing the arrangement of a color difference generation circuit according to the second embodiment of the present invention.

FIG. 7 is a block diagram showing the detailed arrangement of the color difference generation circuit 550 in the second embodiment. The same reference numerals in FIG. 7 denote the same parts as in FIG. 5, and a description thereof will be omitted.

In the first embodiment, G1 and G2 are respectively interpolated for respective pixels, and the linear arithmetic circuit 557 calculates Gb(=(G1+G2)/2).

Figure 8:
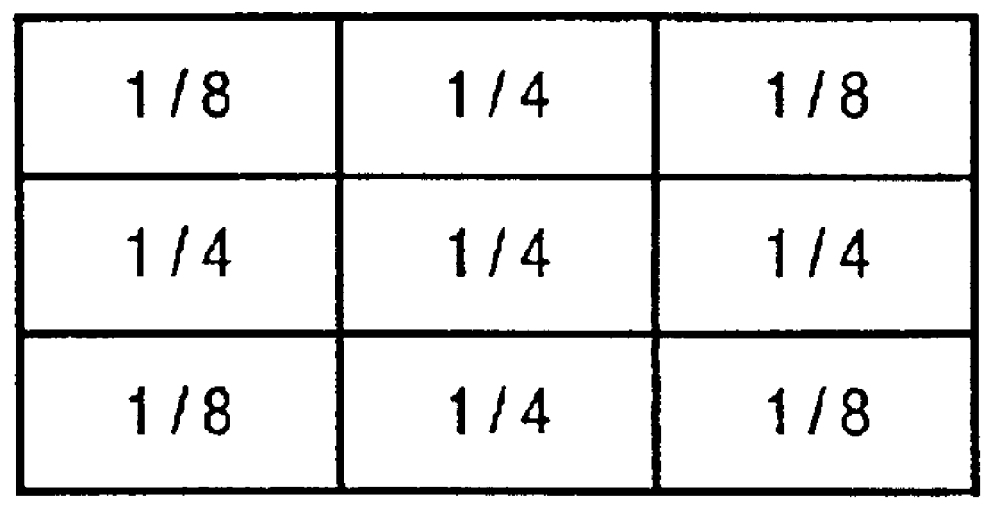

However, this linear arithmetic operation is equivalent to simple interpolation of a G signal using an interpolation filter shown in FIG. 8 without distinguishing G1 and G2 from each other. Therefore, G1 and G2 signals are input to a color interpolation circuit 570, and are interpolated using the interpolation filter shown in FIG. 8 in place of the linear arithmetic circuit 557 in FIG. 5, thus obtaining the same effect as in the first embodiment. Since other arrangements are the same as those described in the first embodiment with reference to FIG. 5, a description thereof will be omitted.

As described above, according to the second embodiment, the same effect as in the first embodiment can be obtained.

<Other Embodiment>

The present invention can be applied to a system constituted by a plurality of devices (e.g., host computer, interface, scanner, video camera) or to an apparatus comprising a single device (e.g., copying machine, facsimile machine).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiments, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM can be used for providing the program codes.

Furthermore, besides aforesaid functions according to the above embodiments are realized by executing the program codes which are read by a computer, the present invention includes a case where an OS (operating system) or the like working on the computer performs a part or entire processes in accordance with designations of the program codes and realizes functions according to the above embodiments.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiments.

In a case where the present invention is applied to the aforesaid storage medium, the storage medium stores program codes corresponding to the flowchart shown in FIG. 2 described in the embodiment.

The present invention is not limited to the above embodiments and various changes and modifications can be made within the spirit and scope of the present invention. Therefore to apprise the public of the scope of the present invention, the following claims are made.

What is claimed is:

1. A signal processing apparatus comprising:
    an image sensor covered by a plurality of color filters which form a predetermined matrix;
    an interpolation unit adapted to execute an interpolation process of color image data output from said image sensor;
    a discrimination unit adapted to discriminate horizontal and vertical correlation levels on the basis of the color image data;
    a first color difference signal calculation unit adapted to calculate first color difference signals by color-separating image data of respective colors interpolated by said interpolation unit in a direction with a higher correlation level on the basis of the discrimination result of said discrimination unit;
    a second color difference signal calculation unit adapted to calculate second color difference signals by a predetermined arithmetic operation different from said first color difference signal calculation unit on the basis of image data of respective colors interpolated by said interpolation unit; and
    a selector adapted to select and output either of the first and second color difference signals on the basis of the first and second color difference signals.

2. The apparatus according to claim 1, wherein said second color difference signal calculation unit uses the predetermined arithmetic operation which does not depend on the vertical and horizontal correlation levels discriminated by said discrimination unit (600).

3. The apparatus according to claim 1, wherein said second color difference signal calculation unit calculates the second color difference signals by a linear arithmetic operation.

4. The apparatus according to claim 1, wherein said selector comprises a first calculation unit adapted to calculate a first saturation value from the first color difference signals, and a second calculation unit adapted to calculate a second saturation value from the second color difference signals.

5. The apparatus according to claim 4, wherein said first calculation unit calculates a sum of absolute values of the first color difference signals as the first saturation value, and said second calculation unit calculates a sum of absolute values of the second color difference signals as the second saturation value.

6. The apparatus according to claim 4, wherein said first calculation unit calculates a square sum or square root of the first color difference signals as the first saturation value, and said second calculation unit calculates a square sum or square root of the second color difference signals as the second saturation value.

7. The apparatus according to claim 4, wherein said selector compares the first and second saturation values, and selects color difference signals corresponding to the smaller saturation value.

8. The apparatus according to claim 4, wherein said selector comprises a comparison means adapted to compare the first and second saturation values, and output a selection signal on the basis of a comparison result, and selects and outputs the first or second color difference signals on the basis of the selection signal.

9. The apparatus according to claim 8, wherein said comparison means outputs the selection signal for selecting color difference signals corresponding to the smaller saturation value.

10. A signal processing method comprising:
    converting an optical image into an electrical signal using image sensor covered by filters of a plurality of colors, which form a predetermined matrix, and outputting color image data;
    executing an interpolation process on the basis of the color image data, so that pixels respectively have image data of the plurality of different colors;
    discriminating horizontal and vertical correlation levels on the basis of the color image data;
    calculating first color difference signals by color-separating interpolated image data of respective colors in a direction with a higher correlation level on the basis of the discrimination result;
    calculating second color difference signals by a predetermined arithmetic operation different from an operation for obtaining the first color difference signal on the basis of interpolated image data of respective colors; and
    selecting and outputting either of the first and second color difference signals on the basis of the first and second color difference signals.

11. The method according to claim 10, wherein upon calculating the second color difference signal, the predetermined arithmetic operation which does not depend on the discriminated vertical and horizontal correlation levels is used.

12. The method according to claim 10, wherein upon calculating the second color difference signal, the second color difference signals are calculated by a linear arithmetic operation.

13. The method according to claim 10, wherein upon selecting either of the first and second color difference signals, a first saturation value is calculated from the first color difference signals, and a second saturation value is calculated from the second color difference signals.

14. The method according to claim 13, wherein upon calculating the first saturation value, a sum of absolute values of the first color difference signals is calculated as the first saturation value, and upon calculating the second saturation value, a sum of absolute values of the second color difference signals is calculated as the second saturation value.

15. The method according to claim 13, wherein upon calculating the first saturation value, a square sum or square root of the first color difference signals is calculated as the first saturation value, and upon calculating the second saturation value, a square sum or square root of the second color difference signals is calculated as the second saturation value.

16. The method according to claim 13, wherein upon selecting either of the first and second color difference signals, the first and second saturation values are compared, and a color difference signal corresponding to the smaller saturation value is selected.

17. The method according to claim 13, wherein upon selecting either of the first and second color difference signals, the first and second saturation values are compared, a selection signal on the basis of a comparison result is output, and either the first or second color difference signals is selected and output on the basis of the selection signal.

18. The method according to claim 15, wherein upon comparing the first and second saturation values, the selection signal for selecting color difference signals corresponding to the smaller saturation value is output.

19. A computer program product comprising a computer usable medium having computer readable program code means embodied in said medium for a signal processing method, said product including:

first computer readable program code means for converting an optical image into an electrical signal using image sensor covered by filters of a plurality of colors, which form a predetermined matrix, and outputting color image data;

second computer readable program code means for executing an interpolation process on the basis of the color image data, so that pixels respectively have image data of the plurality of different colors;

third computer readable program code means for discriminating horizontal and vertical correlation levels on the basis of the color image data;

fourth computer readable program code means for calculating first color difference signals by color-separating interpolated image data of respective colors in a direction with a higher correlation level on the basis of the discrimination result;

fifth computer readable program code means for calculating second color difference signals by a predetermined arithmetic operation different from an operation for obtaining the first color difference signal on the basis of interpolated image data of respective colors; and sixth computer readable program code means for selecting and outputting either of the first and second color difference signals on the basis of the first and second color difference signals.

* * * * *